T. R. BEGGS.
HEAT INSULATING STRUCTURE.
APPLICATION FILED SEPT. 28, 1916.
1,238,737. Patented Sept. 4, 1917.
2 SHEETS—SHEET 1.
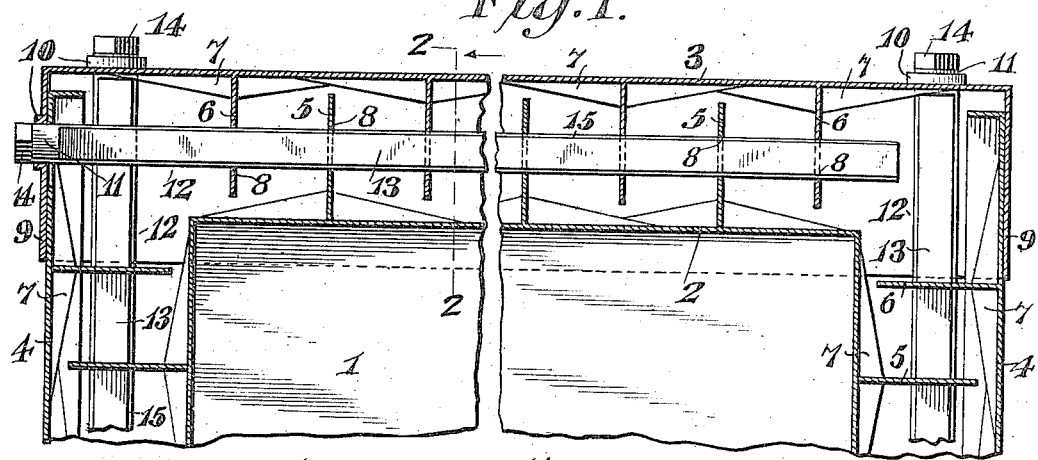
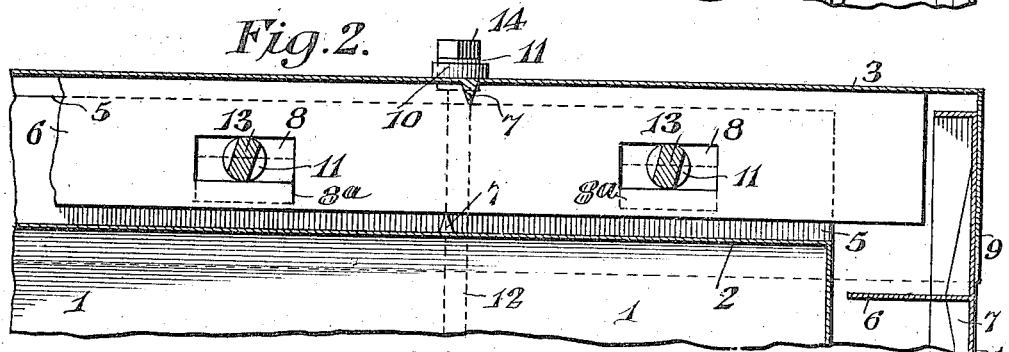
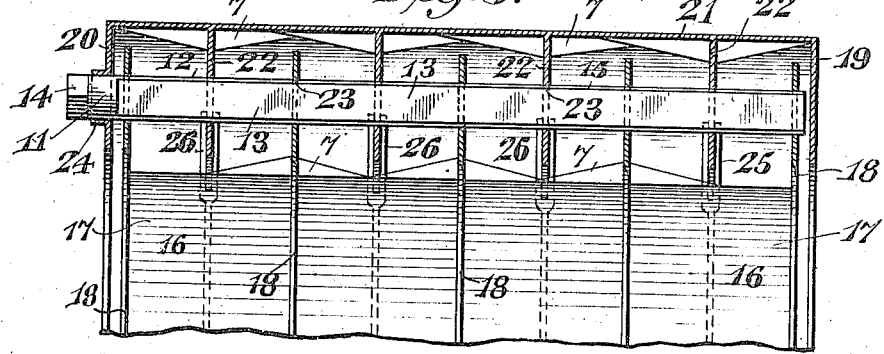
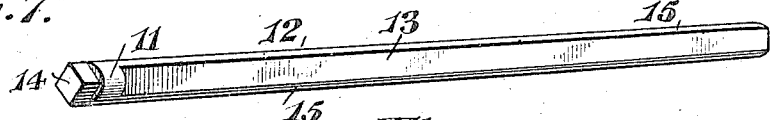
WITNESSES
Jas. K. McCathran
F. T. Chapman
Thomas R. Beggs INVENTOR
BY C. G. Biggs
ATTORNEY

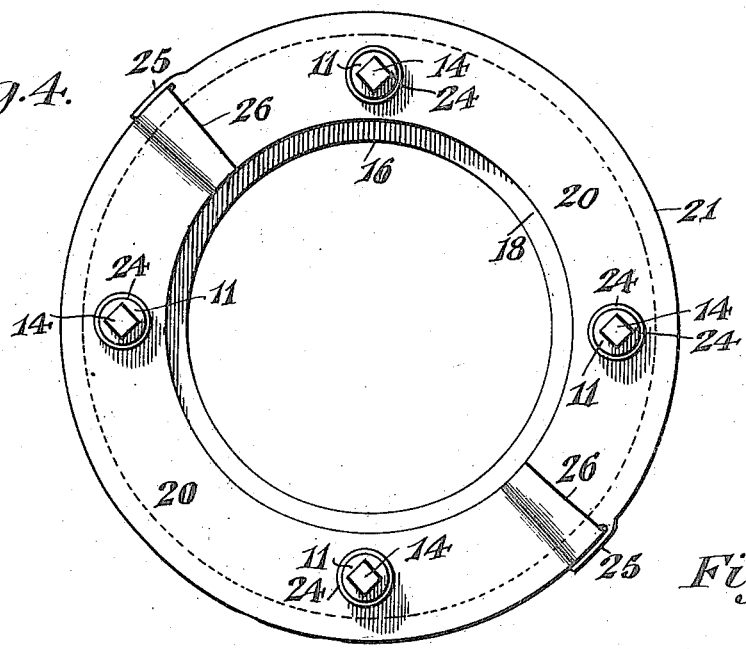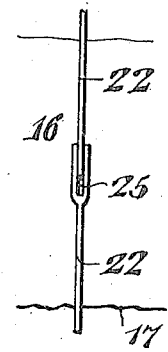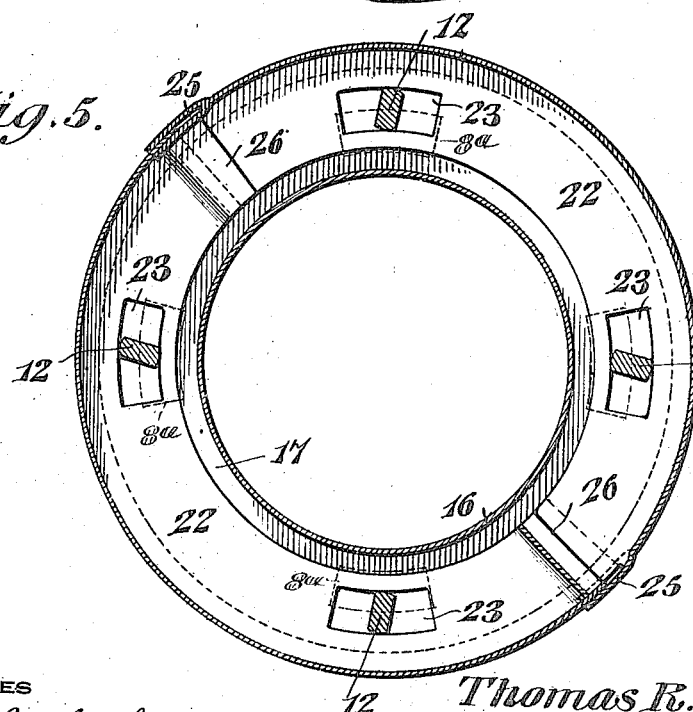

UNITED STATES PATENT OFFICE.

THOMAS R. BEGGS, OF NEW YORK, N. Y.

HEAT-INSULATING STRUCTURE.

1,238,737. Specification of Letters Patent. Patented Sept. 4, 1917.

Application filed September 28, 1916. Serial No. 122,695.

*To all whom it may concern:*

Be it known that I, THOMAS R. BEGGS, a citizen of the United States, residing at New York, in the county of New York and State of New York, have invented a new and useful Heat-Insulating Structure, of which the following is a specification.

This invention has reference to heat insulating structures, and its object is to provide a hollow wall structure for ice boxes or other devices where the interchange of heat is to be prevented, and wherein the walls of the structure may be made of light material.

The invention is particularly applicable to ice boxes or other structures used in beer cooling apparatus, but the invention may be employed in many other connections.

For convenience of description it will be considered that the structure to which the invention is applied is an ice box or refrigerator without, however, by the use of such terms limiting the invention to the specific devices to which such terms are customarily applied.

In accordance with the present invention the walls of the refrigerating chamber are made of sheet metal which may be of so light a gage as to be easily distorted if made after customary plans, or if suitably braced in accordance with customary plans would present so many ready conductors of heat between the inner and outer walls of the refrigerating chamber that the heat insulating qualities thereof would be largely reduced.

The present invention provides inner and outer walls, as is customary, with a dead air space between them and with stiffening, bracing and interlocking means so arranged that heat conducting connection between the inner and outer walls is reduced to a minimum, and while there are some direct paths for heat between the inner and outer walls such paths are reduced to so small a cross-sectional area as to represent but a minute fraction of the area of braces or other like devices as heretofore employed. Moreover, the invention provides a means whereby the inner and outer walls are connected and stiffened, so that the parts are readily assembled and then rigidly connected without liability of collapse of any kind even though the walls themselves be of thin sheet metal.

The invention has the further advantage of capability of embodiment with a minimum weight of material and consequent reduction in cost with the inner and outer walls capable of production separately and of assembly in rigid connection without the aid of tools other than a wrench or similar device, and only a partial turn of the locking device.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the apended claims.

In the drawings:—

Figure 1 is a sectional view of one end of a refrigerator or ice chest or other structure, wherein it is desired to prevent exchange of heat between the inner and outer walls, the showing being that of a rectangular or similarly shaped hollow body.

Fig. 2 is a section on the line 2—2 of Fig. 1, the showing also being of fragmentary nature.

Fig. 3 is a section similar to Fig. 1 but showing a circular or other curved form of ice chest or refrigerator.

Fig. 4 is an end view of a device embodying the construction of Fig. 3, but omitting the exterior casing.

Fig. 5 is a section at right angles to the showing of Fig. 3, but including the whole circumference of the ice chest.

Fig. 6 is a detail view showing a slip joint part of the structure of Figs. 3, 4 and 5.

Fig. 7 is a perspective view of one of the locking rods forming part of the present invention.

Referring to the drawings, particularly to Figs. 1, 2 and 7, there is shown a refrigerator or ice chest or other container having an inner chamber 1 with walls 2 and exterior walls 3, 4 forming part of the outer casing, with the walls all formed of sheet metal which may be of relatively thin gage.

In the finished structure the outer walls may be inclosed in a suitable casing of wood or other material, but as such arrangements are quite common no attempt is made to show any outer casing. The inner chamber 1 may be constructed as a whole with the walls permanently joined and having provision for access to the interior of the casing, although such last-named arrangement is not indicated in the structure of Figs. 1 and 2. On the exterior of the walls 2 are ribs 5 projecting outwardly and extending in suitable directions about the chamber 1. These walls have a width somewhat less than the final spacing between the inner and outer walls of the device, so that when the walls are in their final position there is no contact between any one of the ribs 5 and the walls 3 or 4. There are other ribs 6, similar to the ribs 5 but carried by and projecting from the walls 3 and 4, respectively. The ribs 6 project from the walls 3 and 4 toward the walls 2 of the chamber 1 and extend along the walls 3 and 4 in parallel spaced relation to the ribs 5, so that the ribs 5 and 6 are about equi-distantly spaced.

The ribs 5 and 6 serve as stiffening means for the respective walls from which they project, and the connection between the ribs 5 and 6 and the respective walls may be strengthened by other ribs 7 soldered or otherwise connected to the walls and to the respective ribs.

Each rib 5 and 6 is traversed by a suitable number of passages 8 which may be all similarly spaced from the free edges of the ribs, and so arranged that they form groups extending transversely of the ribs and under circumstances to be described may be brought into alinement. The width of the ribs is less than the width of the spaces between the walls in the final or installed condition of the parts. When the parts are assembled the wall 3, for instance, is applied to a corresponding wall 2 of the compartment or chamber 1, with the ribs 6 resting against or close to the wall 2 and the ribs 5 in engagement with or close to the wall 3. Under these circumstances each group of passages 8 have portions only in alinement, the passages zigzagging throughout the group. In the particular showing of Fig. 1 opposite edges of the wall 3 are provided with right angle flanges 9, in one of which there is formed a bearing 10 for a cylindrical portion 11 of a rod 12, the latter having opposite sides 13 flattened throughout the greater portion of the length of the rod, so that the thickness of the rod in one direction is greatly reduced, but in a direction at right angles thereto the rod may be of full diameter, or of considerably greater thickness than between the flattened sides 13.

When the ribs are in substantial contact or close to the opposed walls, the passages 8 of the ribs 6 are closer to the wall 2 than are the passages 8 of the ribs 5, such closer position being indicated in dotted lines at 8ᵃ in Fig. 2. This means that the respectively opposite walls of alternate passages 8 of a group are spaced apart by a distance considerably less than the full diameter of the rod 12, but about the same or somewhat more than the thickness of the rod between the sides or walls 13. This thinner portion of the rod 12 may, therefore, be introduced through the series of passages 8 then in approximate alinement with the flattened sides 13 opposed to the respectively opposite edges of the passages 8 through which the rod extends, while the cylindrical portion 11 of the rod is seated in the bearing 10. Beyond the cylindrical portion 11 at the end thereof remote from the flattened sides 13 the rod is squared, as shown at 14, or is otherwise appropriately shaped for the application of a tool. If, now, a suitable tool be applied to the end 14 and the rod be turned about its longitudinal axis, the narrower edges of the rod, indicated at 15, are brought into engagement, at the corners, where they merge into the flattened portions 13, with the edges of the passages 8 on the opposite sides of the passages in the alternately arranged ribs or webs 5 and 6. The result is that the rod 12 operates as a cam rod engaging the ribs or webs 5 and 6, and tending to move them in opposite directions, whereby the wall 3, if such be the movable wall, is forced away from the wall 2 until the edges 15 of the rod 12 engage corresponding edges of the passages 8. By suitably proportioning the rod 12 and passages 8 the rod may be made to cramp in the passages after having been turned sufficiently to separate the walls 2 and 3 to the greatest desired extent, the ribs or webs 5 and 6 then having their free edges spaced from the opposite walls 3 and 2, respectively, to an extent represented by the difference between the diameter of rod at the walls 13 and the full diameter of the rod. Since the thickness of the ribs or webs 5 and 6 need only be that of the sheet metal of which the structure is made, and since the edges 15 may be round, the area of engagement between the rod 12 and the several webs 5 and 6 is of extremely small area. Consequently, the chance of heat conductivity between the walls 2 and 3 is reduced to a negligible minimum, since the heat must travel, say, from the wall 3 through a rib or web 6, then by way of the minute area of contact with the rod 12, along said rod 12 for a distance equal to the spacing between a web or rib 5 and 6, and thence by way of the extremely small area of contact between the rod and the web 5 and along the latter to the wall 2. Although there are numerous points of engagement between each rod and the several webs, and the device necessitates the employment of several locking rods, the combined area of contact is minute as compared to the area of either of the walls 2 or 3. There is, therefore, a negligible possibility of leak or heat transference between the walls 2 and 3 by metallic paths, while, of course, the air path between these walls is highly resistant to heat transference. At the same time the structure is particularly rigid, and, furthermore, the liability of circulation of air in the space between the walls is greatly reduced because of the baffle effect of the ribs or webs alternating in such space and providing a tortuous air path should there be any tendency for a circulation of air and the consequent reduction in the heat insulating qualities of the air, which qualities are largely increased by having the air practically dead.

The arrangement between the walls 4 and the corresponding walls 2 of the chamber 1 is the same as is the case with the wall 3. The flanges 9 may be so arranged as to partially embrace the walls 4 and the parts are so proportioned that the walls 4 in the particular construction shown in Figs. 1 and 2 are interior to the flanges 9, but are brought into contact with the flanges 9 when the walls 3 and 4 are in the expanded condition with respect to the chamber 1. Since the web and locking rod arangement is the same with respect to the walls 4 as it is with respect to the wall 3, the same reference numerals are used throughout and the same explanation will apply.

The showing of Figs. 1 and 2 has to do with a rectangular or other non-circular form of ice box or refrigerator, or other device, while the showing of Figs. 3, 4, 5 and 6 has to do with a circular or other curved form of structure. The curved structure is shown as comprising a cylindrical chamber 16 having a longitudinal cylindrical wall 17 with end and intermediate ribs or webs 18 corresponding to the ribs or webs 5 of the structure of Fig. 1. There is also provided a cylindrical shell 19 surrounding the chamber 16 with its webs or ribs 18, the shell or casing 19 having end flanges 20 spaced apart a distance greater than the length of the chamber 16 and also provided with a main cylindrical wall 21 having radially inwardly directed annular webs or ribs 22 alternating with the ribs 18 and equidistantly spaced therefrom. All the ribs or webs have passages 23 corresponding with the passages 8 of the structure of Fig. 1. These passages are designed to receive a bar 12 corresponding to the bar 12 of the structure of Fig. 1. One end flange 20 is formed with a bearing 24 for the cylindrical part 11 of the bar 12. The ribs or webs 18 and 22 may be provided with reinforcing ribs 7, as in the case of the structure of Fig. 1.

The casing 19 when of cylindrical form is a two-part casing with both the wall 21 and the ribs or webs 22 formed with slip joints 25, 26, respectively, so that the wall may expand or contract. Usually diametrically opposed slip joints will answer, but more may be used if needed. One of the slip joints is shown separately in Fig. 6.

The operation of the structure of Figs. 3, 4 and 5 is the same as that of the structure of Figs. 1 and 2, the outer casing being a multipart casing to allow for expansion and contraction, while the inner casing or chamber may be of one part construction in the sense that it need neither expand nor contract.

While in the structure of Figs. 3, 4 and 5 the end walls of the casing or chamber 16 are shown considerably spaced from the end flanges 20 of the casing 19, it will be understood that these parts may be in relatively close relation and that circulation of air between the space between the two walls or casings may be prevented in any suitable way, while the whole structure may be inclosed in a wooden or any other envelop providing a suitable finish with heads or doors for the ends permitting access to the interior of the chamber 16.

The invention has to do with the arrangement of the heat insulating air space in the structure, whereby such air space is provided and so exterior parts used merely for closing in and incasing the heat insulating parts have been omitted from the drawings.

While for simplicity of illustration the rectangular or non-circular form shown in Figs. 1 and 2 has been illustrated as having square corners, it will be understood that other forms of corner structure may be employed.

The invention is applicable not only for ice-boxes or refrigerators, but for many kinds of boxes or walls where heat transference is retarded. The invention is applicable for dead air spaces or spaces from which air is exhausted to provide vacuum heat insulation.

What is claimed is:—

1. A heat insulating structure having inner and outer walls relatively movable one with respect to the other, each wall having ribs or webs thereon projecting toward the other wall and of less extent of projection than the spacing of the walls apart in the installed structure, the webs or ribs of one wall alternating with and spaced from those of the other, and spreading means traversing all the webs and movable in the webs to separate the walls and lock them in the separated position.

2. A heat insulating structure having inner and outer walls relatively movable one with respect to the other, each wall having ribs or webs thereon projecting toward the outer wall and of less extent of projection than the spacing of the walls apart in the installed structure, the webs or ribs of one wall alternating with and spaced from those of the other, and spreading means traversing all the webs and movable in the webs to separate the walls and lock them in the separated position, the locking means having those portions engaging the webs of minute area as compared with the cross-sectional area of either the webs or walls.

3. A heat insulating structure having inner and outer walls confining an air space between them, reinforcing members on each wall projecting toward the other wall and located in the air space between the walls, said reinforcing members alternating one with the other and spaced one from the other and also overlapping in the direction of projection toward the opposite walls, said reinforcing members having passages therethrough in line one with the other, and a locking member extending through the passages and movable in a direction to engage opposite walls of alternating passages to bring the passages into alinement and thereby separate the walls correspondingly.

4. A heat insulating structure comprising inner and outer walls with reinforcing ribs or webs on the facing surfaces of the walls, said ribs or webs being extended and in parallel relation with the webs provided with passages in line with each other with the line of passages perpendicular to the lengths of the webs, and a locking member extending through the passages and movable to engage alternately opposite edges of the passages to force one wall away from the other and to lock the walls in the spread position.

5. A heat insulating structure comprising inner and outer walls with reinforcing ribs or webs on the facing surfaces of the walls, said ribs or webs being extended and in parallel relation, with the webs provided with passages in line with each other with the line of passages perpendicular to the lengths of the webs, and a locking member extending through the passages and movable to engage alternately opposite edges of the passages to force one wall away from the other and to lock the walls in the spread position, said locking member comprising a rotatable bar with opposite sides flattened, the passages through the webs being arranged to permit the introduction of the bar with the flattened portions substantially parallel with the inner and outer walls, and said bar on rotation engaging alternately opposite edges of the passages through the alternating webs to aline the passages and thereby spread the walls.

6. A heat insulating structure comprising an inner wall with a series of parallel webs or ribs each having a passage therethrough in alinement with the passages in the other webs, an outer wall having a series of ribs or webs similar to those of the inner wall and projecting toward the inner wall and each provided with a passage alining with those in the other webs of the same wall, and a spreading and locking bar having flattened sides to narrow the bar on one diameter, the webs of one wall alternating with those of the other in spaced relation thereto and approaching the opposite wall, and the bar being introducible through the passages of the webs of both walls when the walls are in close approach and rotatable to bring the portion of the bar of greater diameter into engagement with the opposite edges of alternating passages to spread the walls one from the other and lock them in the spread position.

7. A heat insulating structure, comprising an inner wall with a series of parallel webs or ribs each having a passage therethrough in alinement with the passages in the other webs, an outer wall having a series of ribs or webs similar to those of the inner wall and projecting toward the inner wall and each provided with a passage alining with those in the other webs of the same wall, and a spreading and locking bar having flattened sides to narrow the bar on one diameter, the webs of one wall alternating with those of the other in spaced relation thereto and approaching the opposite wall, and the bar being introducible through the passages of the webs of both walls when the walls are in close approach and rotatable to bring the portion of the bar of greater diameter into engagement with the opposite edges of alternating passages to spread the walls one from the other and lock them in the spread position, the outer wall being sectional with the sections slidable one on the other to permit the expansion of the outer wall with respect to the inner wall.

8. A heat insulating structure having spaced walls opposed one to the other with each wall provided with members projecting toward the other wall, and spreading means engaging said members and movable with relation thereto to spread the walls apart, said spreading means and members engaged thereby having their contacting portions of minute area as compared with that of either the spreading means or the members engaged thereby.

In testimony that I claim the foregoing as my own, I have hereto affixed my signature in the presence of two witnesses.

THOMAS R. BEGGS.

Witnesses:
WILLIAM AGUSTUS PRICE,
DANIEL MINER.

Copies of this patent may be obtained for five cents each, by addressing the "Commissioner of Patents, Washington, D. C."